United States Patent
Yoshimoto

(10) Patent No.: US 12,452,380 B2
(45) Date of Patent: Oct. 21, 2025

(54) INFORMATION PROCESSING APPARATUS SWITCHING BETWEEN POWER MODES FOR SELECTIVELY TRANSMITTING PRINT DATA TO IMAGE FORMING APPARATUS BASED ON PROCESSING TIME REQUIRED FOR COMPLETING IMAGE FORMING

(71) Applicant: CANON KABUSHIKI KAISHA, Tokyo (JP)

(72) Inventor: Tetsuhiro Yoshimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 18/179,996

(22) Filed: Mar. 7, 2023

(65) Prior Publication Data

US 2023/0291854 A1    Sep. 14, 2023

(30) Foreign Application Priority Data

Mar. 14, 2022   (JP) .................. 2022-039449

(51) Int. Cl.
  *G06F 1/32*    (2019.01)
  *G06F 1/3234*  (2019.01)
  *G06F 1/324*   (2019.01)
  *H04N 1/00*    (2006.01)

(52) U.S. Cl.
  CPC ......... *H04N 1/00896* (2013.01); *G06F 1/324* (2013.01); *G06F 1/3265* (2013.01)

(58) Field of Classification Search
  None
  See application file for complete search history.

(56) References Cited

U.S. PATENT DOCUMENTS

| | | | |
|---|---|---|---|
| 10,792,945 B2 | 10/2020 | Hasegawa | |
| 2006/0221382 A1* | 10/2006 | Sedky | G06F 3/122 358/1.15 |
| 2008/0109663 A1* | 5/2008 | Snyder | B41J 29/393 713/300 |
| 2010/0202009 A1* | 8/2010 | Greene | G06F 3/126 358/1.15 |
| 2010/0257394 A1* | 10/2010 | Koga | H04N 1/00896 713/324 |
| 2012/0243022 A1* | 9/2012 | Kamei | G06F 3/1286 358/1.13 |
| 2013/0342868 A1* | 12/2013 | Sugiyama | G06F 3/1293 358/1.15 |

(Continued)

*Primary Examiner* — Danny Chan
(74) *Attorney, Agent, or Firm* — Canon U.S.A., Inc. IP Division

(57) ABSTRACT

An image forming system includes an information processing apparatus configured to output, to an image forming apparatus, information about an image forming job to form an image on a recording medium, the image forming apparatus being configured to be operable in a plurality of power modes including a normal power mode in which the information is output and a power saving mode in which power consumption is less than the normal power mode; an image forming apparatus includes a storage unit configured to store the information about two or more image forming jobs output from the information processing apparatus; and an image forming unit configured to form an image on the recording medium based on the information stored in the storage unit.

10 Claims, 5 Drawing Sheets

(56) References Cited

U.S. PATENT DOCUMENTS

| | | | |
|---|---|---|---|
| 2014/0189351 A1* | 7/2014 | Steely | G06F 21/608 |
| | | | 713/168 |
| 2015/0317105 A1* | 11/2015 | Morooka | G06F 3/1206 |
| | | | 358/1.15 |
| 2016/0012321 A1* | 1/2016 | Oguma | G06F 3/1285 |
| | | | 358/1.15 |
| 2019/0092070 A1 | 3/2019 | Hasegawa | |
| 2019/0325761 A1* | 10/2019 | Ohno | H04N 1/00896 |

* cited by examiner

INFORMATION PROCESSING APPARATUS SWITCHING BETWEEN POWER MODES FOR SELECTIVELY TRANSMITTING PRINT DATA TO IMAGE FORMING APPARATUS BASED ON PROCESSING TIME REQUIRED FOR COMPLETING IMAGE FORMING

BACKGROUND

Field of the Disclosure

The present disclosure relates to an information processing apparatus to be connected to an image forming apparatus, and an image forming system having an information processing apparatus and an image forming apparatus.

Description of the Related Art

There has been known an image forming system having an image forming apparatus to form an image on a printing material and a control device provided outside the image forming apparatus and connected to the image forming apparatus (U.S. patent Ser. No. 10/792,945 B2). The control device may be called "DFE (Digital Front End)". The DFE described in U.S. patent Ser. No. 10/792,945 B2 generates image data based on contents of a print job sent from an external device such as a personal computer (PC), and sends the generated image data to an image forming apparatus. The image forming apparatus stores the image data obtained from the DFE in a memory to perform a print process based on the image data stored in the memory.

For example, in a case where the image forming apparatus is executing a first print job and image data corresponding to a second print job is sent from the DFE to the image forming apparatus, the following issues may occur. Specifically, a remaining amount of the memory in the image forming apparatus executing the first print job may be less than an amount of image data corresponding to the second print job. In this case, for example, the DFE stops transmission of the image data corresponding to the second print job, and resumes transmission of the image data corresponding to the second print job when free space becomes available in the memory of the image forming apparatus. During a period from when the transmission of the image data corresponding to the second print job is stopped until when the transmission of the image data corresponding to the second print job is resumed, the DFE is in a state where power is supplied to various components in the DFE. Thus, the power is wasted in the DFE during the period from when the transmission of the image data is stopped until when the transmission of the image data is resumed. As a result, power consumption in the image forming system increases.

SUMMARY

An image forming system according to embodiments of the present disclosure includes: an information processing apparatus configured to output, to an image forming apparatus, information about an image forming job to form an image on a recording medium, the image forming apparatus being configured to be operable in a plurality of power modes including a normal power mode in which the information is output and a power saving mode in which power consumption is less than the normal power mode; an image forming apparatus includes: a storage unit configured to store the information about two or more image forming jobs output from the information processing apparatus; and an image forming unit configured to form an image on the recording medium based on the information stored in the storage unit, wherein, in a state where the power mode of the information processing apparatus is the normal power mode, in a case where a value represented by progress information of the image forming job by the image forming apparatus becomes more than a first predetermined value, outputting of the information from the information processing apparatus is stopped, and the power mode is transitioned from the normal power mode to the power saving mode, wherein, in a state where the power mode of the information processing apparatus is the power saving mode, in a case where a value represented by the progress information becomes less than a second predetermined value, the power mode is transitioned from the power saving mode to the normal power mode, and the outputting of the information from the information processing apparatus is started, and wherein the second predetermined value is less than the first predetermined value.

An information processing apparatus according to the present disclosure configured to communicate with an image forming apparatus configured to form an image on a recording medium, the image forming apparatus being configured to be operable in a plurality of power modes including a normal power mode in which the information is output and a power saving mode in which power consumption is less than the normal power mode, wherein the information processing apparatus includes: an output unit to output information about an image forming job to form an image on the recording medium, a control unit configured to control a power mode of the information processing apparatus; wherein, in a state where the power mode of the information processing apparatus is the normal power mode, in a case where a value represented by progress information of the image forming job by the image forming apparatus becomes more than a first predetermined value, the output unit is configured to stop outputting of the information, and the control unit is configured to switch the power mode from the normal power mode to the power saving mode, wherein, in a state where the power mode of the information processing apparatus is the power saving mode, in a case where a value represented by the progress information becomes less than a second predetermined value, the control unit is configured to switch the power mode from the power saving mode to the normal power mode, and the output unit is configured to start the outputting of the information, and wherein the second predetermined value is less than the first predetermined value.

Further features of the present disclosure will become apparent from the following description of exemplary embodiments (with reference to the attached drawings).

DESCRIPTION OF THE EMBODIMENTS

In the following, at least one embodiment of the present disclosure is described with reference to the drawings.

<Image Forming Apparatus>

Figure 1:
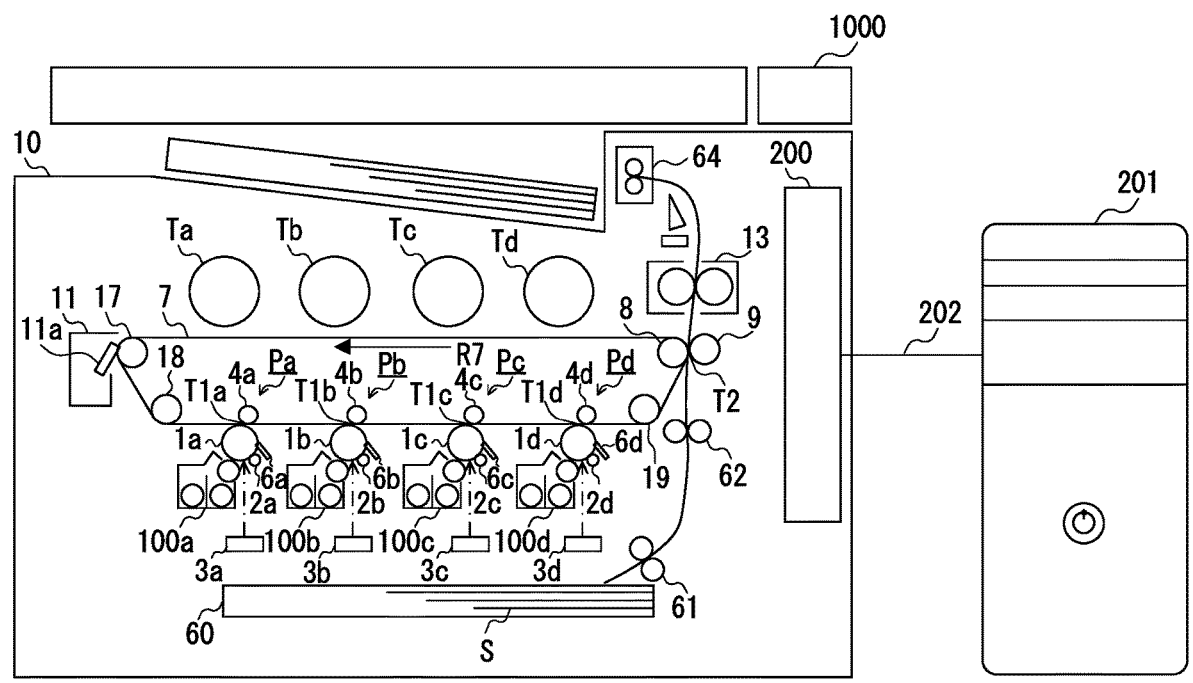
FIG. 1 is a configuration diagram of an image forming system.

FIG. 1 is a configuration diagram representing an image forming system according to the present embodiment. The image forming system includes an image forming apparatus 10 and a DFE 201, which is an external information processing apparatus. The image forming apparatus 10 includes a printer controller 200. The printer controller 200 is communicably connected to the DFE 201 via communication line 202. Details of the printer controller 200 are described later.

The image forming apparatus 10 includes an operation unit 1000 at its top portion. The operation unit 1000 is a user interface having an input interface and an output interface. A user can input predetermined instructions using the operation unit 1000. An input interface includes, for example, various keys, a touch panel, and the like. An output interface is a display, a speaker, and the like.

The image forming apparatus 10 forms an image on a sheet-like printing material S based on image data acquired from the DFE 201. The image forming apparatus 10 forms a color image by electrophotographic image forming. Therefore, the image forming apparatus 10 includes a plurality of image forming units Pa-Pd (four in the present embodiment) corresponding to two or more colors (four colors in the present embodiment). The image forming units Pa-Pd are arranged along a rotation direction of an intermediate transfer belt 7.

Each of the image forming units Pa to Pd forms a toner image of a different color. In the present embodiment, the image forming unit Pa forms a yellow (Y) image. The image forming unit Pb forms a magenta (M) image. The image forming unit Pc forms a cyan (C) toner image. The image forming section 10K forms a black (K) toner image. Each of the image forming units Pa-Pd has the same configuration. Although image forming units Pa-Pd corresponding to four colors are explained in the present embodiment, these are not limited to four colors. Further, an arrangement of the image forming units Pa-Pd are not limited to that illustrated in FIG. 1.

The image forming units Pa-Pd include photoconductors $1a$-$1d$, chargers $2a$-$2d$, exposure devices $3a$-$3d$, developing devices $100a$-$100d$, primary transfer rollers $4a$-$4d$, and photoconductor cleaners $6a$-$6d$. The photoconductors $1a$-$1d$ are drum-shaped, and have a photosensitive layer on their surface. Each of the photoconductors $1a$-$1d$ rotates about its drum axis. The chargers $2a$-$2d$ uniformly charge the surfaces of the rotating photoconductors $1a$-$1d$. The exposure devices $3a$-$3d$ scan the surfaces of the charged photoconductors $1a$-$1d$ with laser beams modulated based on the image data. Electrostatic latent images are formed on the surfaces of the photoconductors $1a$-$1d$ by scanning with the laser beams. The developing devices $100a$-$100d$ develop electrostatic latent images with corresponding color developers (toners). As a result, images of corresponding colors (toner images) are formed on the photoconductors $1a$-$1d$.

Developing devices $100a$-$100d$ are replenished with toner from toner storage units Ta-Td via corresponding toner replenishing devices (not shown) in a case where an amount of stored toner is reduced. In a case where the amount of toner in the toner replenishing device decreases, the toner is supplied from the toner storage units Ta to Td. The developing devices $100a$-$100d$ store two-component developer in which non-magnetic toner and magnetic carrier are mixed, or store single-component developer that is magnetic toner or non-magnetic toner alone. The toner storage units Ta-Td are arranged at a top portion of the image forming units Pa-Pd.

A primary transfer units T1$a$-T2$d$ are formed between the primary transfer rollers $4a$-$4d$ and the corresponding photoconductors $1a$-$1d$, with the intermediate transfer belt 7 in between. The primary transfer rollers $4a$-$4d$ transfer the toner image from the photoconductors $1a$-$1d$ on the intermediate transfer belt 7 by applying a predetermined pressure and an electrostatic load bias. Residual transfer toner remaining on the photoconductors $1a$-$1d$ after transfer is collected by photoconductor cleaners $6a$-$6d$.

The intermediate transfer belt 7 is an endless belt provided on an intermediate transfer belt frame (not shown) and stretched around a secondary transfer inner roller 8, tension rollers 17-18, and a secondary transfer upstream roller 19. The secondary transfer inner roller 8 rotates the intermediate transfer belt 7 in a direction of arrow R7. Toner images are sequentially transferred on the intermediate transfer belt 7 from the image forming units $1a$-$1d$ so as to be superimposed as the intermediate transfer belt 7 rotates. As a result, a full-color toner image is formed on the intermediate transfer belt 7. The intermediate transfer belt 7 rotates to convey the toner image, which is carried by the intermediate transfer belt 7, to the secondary transfer inner roller 8.

The image forming apparatus 10 includes a recording material storage 60 for storing the recording material S, a sheet feeding roller 61, registration rollers 62, and a secondary transfer outer roller 9. The recording material S is fed one by one from the recording material storage 60 by the sheet feeding roller 61 which employs a friction separation system. The sheet feeding roller 61 conveys the recording material S to the registration rollers 62 via a conveyance path. The registration rollers 62 correct a skew of the recording material S to convey the recording material S to the secondary transfer outer roller 9 in synchronization with a timing when the image is transferred from the intermediate transfer belt 7 to the recording material S.

The secondary transfer inner roller 8 and the secondary transfer outer roller 9 form a secondary transfer unit T2. The secondary transfer unit T2 nips and conveys, by a transfer nip portion formed by the secondary transfer inner roller 8 and the secondary transfer outer roller 9, the intermediate transfer belt 7 and the recording material S. At this time, the secondary transfer unit T2 transfers, with a given predetermined pressurizing force and an electrostatic load bias, the toner image carried by the intermediate transfer belt 7 onto the recording sheet S conveyed by the registration rollers 62. The transfer residual toner remaining on the intermediate transfer belt 7 after transfer is collected by an intermediate transfer belt cleaner 11 arranged opposite to the tension rollers 17.

The recording material S on which the toner image has been transferred is conveyed to a fixing device 13 by the secondary transfer outer roller 9. The fixing device 13 includes a heating roller and a pressing roller. The fixing device 13 nips and conveys the recording material S on which the toner image has been transferred at a fixing nip formed by the heating roller and the pressing roller. At this time, the fixing device 13 heats and melts the toner image and presses it onto the recording material S to fix the same. As a result, the image is melted and fixed onto the recording material S. Therefore, the heating roller has a heater as a heat source and is controlled to maintain an optimum temperature. The recording material S on which the image is fixed is conveyed from the fixing device 13 to the discharge roller 64. The discharge roller 64 discharges the product, which is the recording material S on which the image is fixed, to an outside of the image forming apparatus 10. As described above, the image forming apparatus 10 performs a print process and creates a product.

<System Controller>

Figure 2:
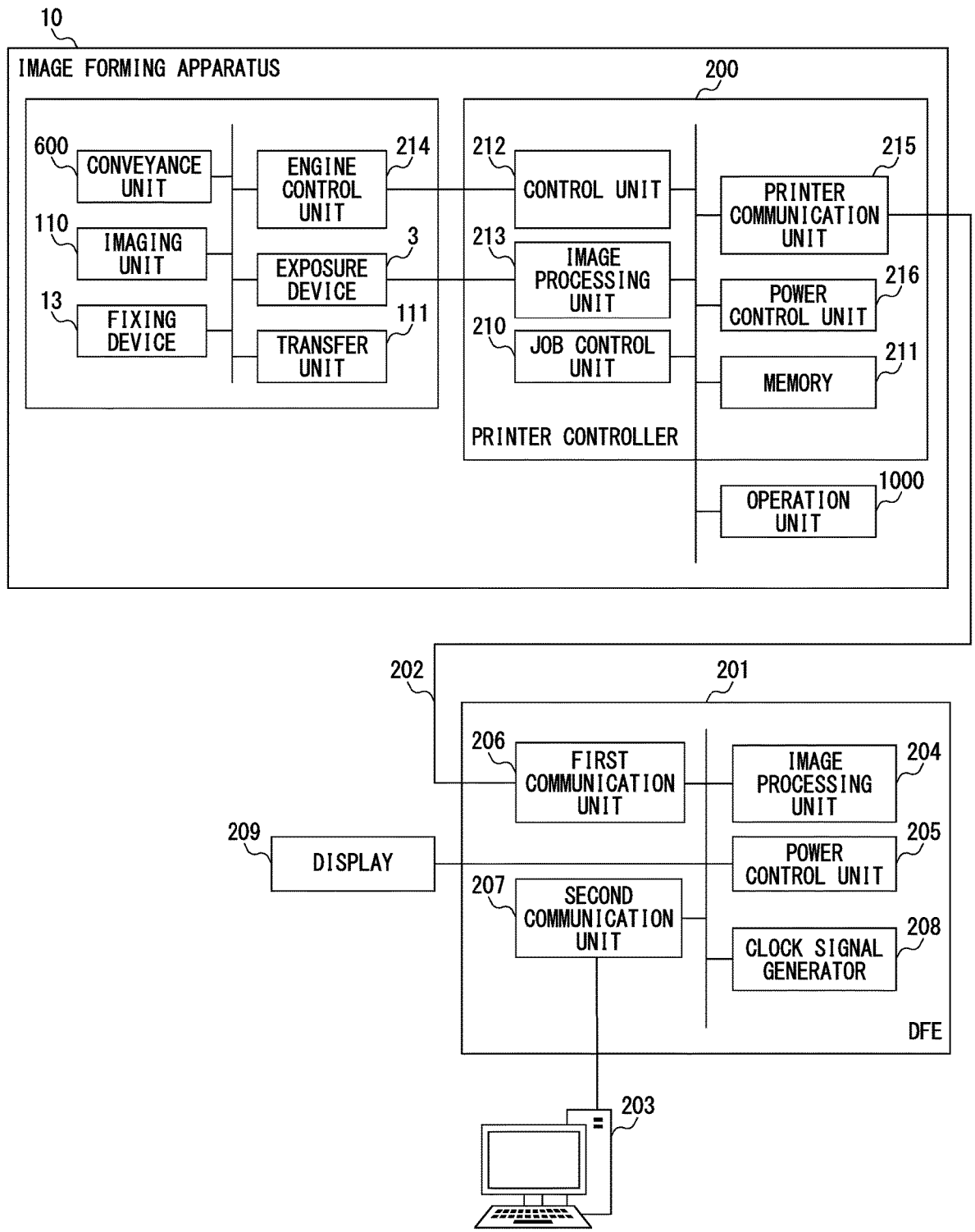
FIG. 2 is a configuration diagram of a control system.

FIG. 2 is a configuration diagram of a control system which controls an operation of the image forming apparatus 10. The control system includes the printer controller 200, which is installed in the image forming apparatus 10, and the DFE 201 externally attached. The printer controller 200 controls the operation of components inside the image forming apparatus 10 to control the above printing process performed by the image forming apparatus 10. The DFE 201 is communicably connected to an external PC (Personal Computer) 203, which is an external device.

The DFE 201 includes an image processing unit 204, a power control unit 205, a first communication unit 206, a second communication unit 207 and a clock signal generator 208. The DFE 201 operates based on the clock signal generated by the clock signal generator 208. These functions are realized by, for example, a central processing unit (CPU) or microprocessor unit (MPU) executing a predetermined computer program. Further, these functions may be realized by a combination of application specific integrated circuit (ASIC) or predetermined electronic components. A display 209 is connected to the DFE 201.

A second communication unit 207 is a communication interface that controls communication with the external PC 203. The second communication unit 207 acquires a print job instructing printing from the external PC. The image processing unit 204 performs a predetermined image process in the print job acquired by the second communication unit 207, and generates image data suitable for the print process by the image forming apparatus 10. The first communication unit 206 is a communication interface that controls communication with the printer controller 200 via the communication line 202. The first communication unit 206 transmits image data generated by the image processing unit 204 to the printer controller 200. The power control unit 205 performs power control of the DFE 201. The power control unit 205 controls the DFE 201 to operate in a power saving mode in which power consumption is reduced compared to normal operation, if necessary.

The printer controller 200 includes a printer communication unit 215, a power control unit 216, a job control unit 210, a memory 211, a control unit 212 and an image processing unit 213. These functions are realized, for example, by a CPU or a MPU executing a predetermined computer program. Also, these functions may be realized by a combination of an ASIC and predetermined electronic components. The operation unit 1000 is also connected to the printer controller 200.

The printer communication unit 215 is a communication interface that controls communication with the DFE 201 via the communication line 202. The printer communication unit 215 acquires image data from the DFE 201. The job control unit 210 stores the image data acquired by the printer communication unit 215 in the memory 211 for each job. The memory 211 in the present embodiment has a predetermined capacity for storing image data. The image processing unit 213 performs a predetermined image process on the image data stored in the memory 211 to transmit the processed image data to the exposure device 3.

The control unit 212 controls the print process that is performed by the image forming apparatus 10. In the present embodiment, the control unit 212 determines the number of print queues representing the number of print jobs based on information stored in the memory 211. Further, based on the information stored in the memory 211, the control unit 212 calculates a job processing time, which is a time required to complete the print job. The control unit 212 stores the number of print queues and the job processing time in the memory 211 as print processing information. The print processing information includes the number of print queues, the job processing time, error information of the image forming apparatus 10, supply information such as remaining amount of toner and a sheet, and status information such as a standby state and a printing state of the image forming apparatus 10. Thus, the print information is state information indicating a print state including the progress of the print process by the image forming apparatus 10. Print processing information is transmitted to the DFE 201 via the communication line 202 by the printer communication unit 215. The power control unit 205 of the DFE 201 determines whether to control the DFE 201 to transition to the power saving mode based on the print processing information.

The control unit 212 transmits the contents (sheet size, paper thickness, paper feed cassette, and the like) of a job registered in the memory 211 to the engine control unit 214. The engine control unit 214 is connected to a conveyance unit 600, an imaging unit 110, a transfer unit 111, the fixing device 13 and the exposure device 3. The engine control unit 214 performs the print process by controlling these operations based on the content of the job to generate the product.

The conveyance unit 600 controls conveying of the recording material S by driving rollers used for discharging the recording material S from the recording material storage 60 to an outside of the image forming apparatus 10. The imaging unit 110 controls the operations of the image forming units Pa-Pd to form toner images on the photoconductors 1a-1d. The transfer unit 111 transfers the toner images formed on the photoconductors 1a-1d onto the recording material S by controlling the operations of the primary transfer rollers 4a-4d, the intermediate transfer belt 7, and the secondary transfer unit T2. The exposure device 3 scans the photoconductors 1a-1d with laser light modulated based on the image data acquired from the image processing unit 213 of the printer controller 200.

The power control unit 216 of the printer controller 200 controls a power supply state of the image forming apparatus 10. For example, the power control unit 216 controls the image forming apparatus 10 to transition to the power saving mode, which consumes less power than in the normal operation, in a case where the image data is not transmitted from the DFE 201 to the image forming apparatus 10 for a predetermined time or more, or in a case where there is no input from the operation unit 1000 for a predetermined time or more. By transitioning to the power saving mode, the image forming apparatus 10 cuts off the power supply to each component except for the control unit 212 and the printer communication unit 215, for example, to reduce the power consumption.

<Operation of DFE>

Figure 3A:
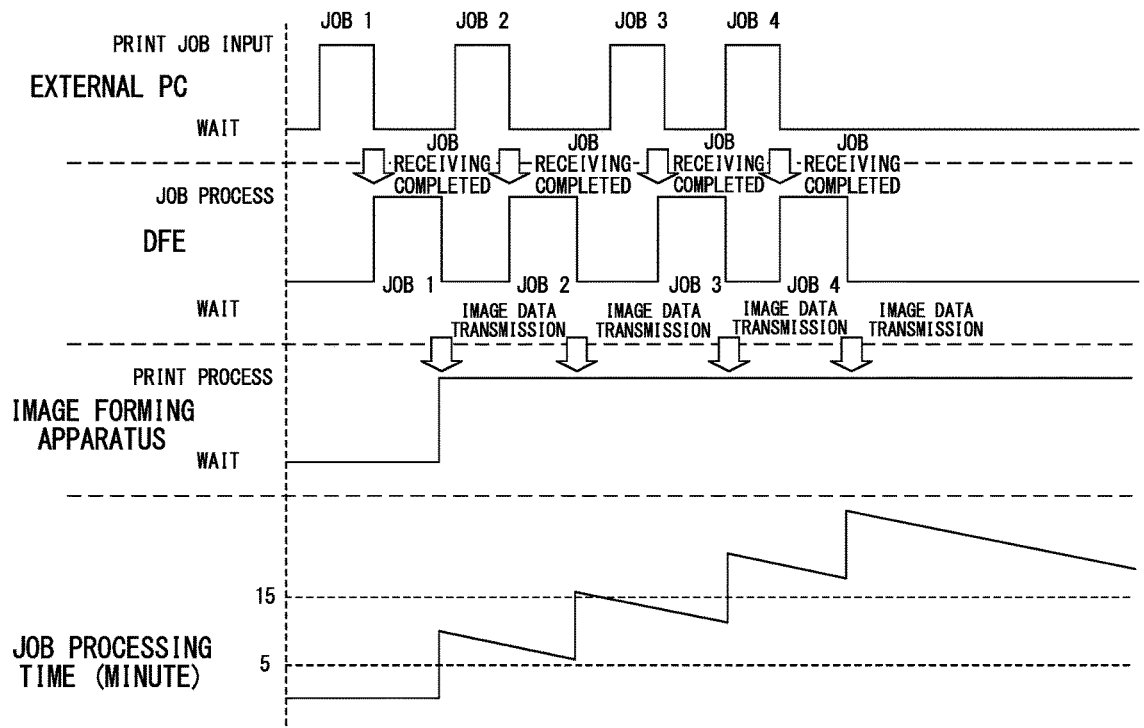
FIG. 3A and FIG. 3B are explanatory diagrams of power saving control of a DFE.
Figure 3B:
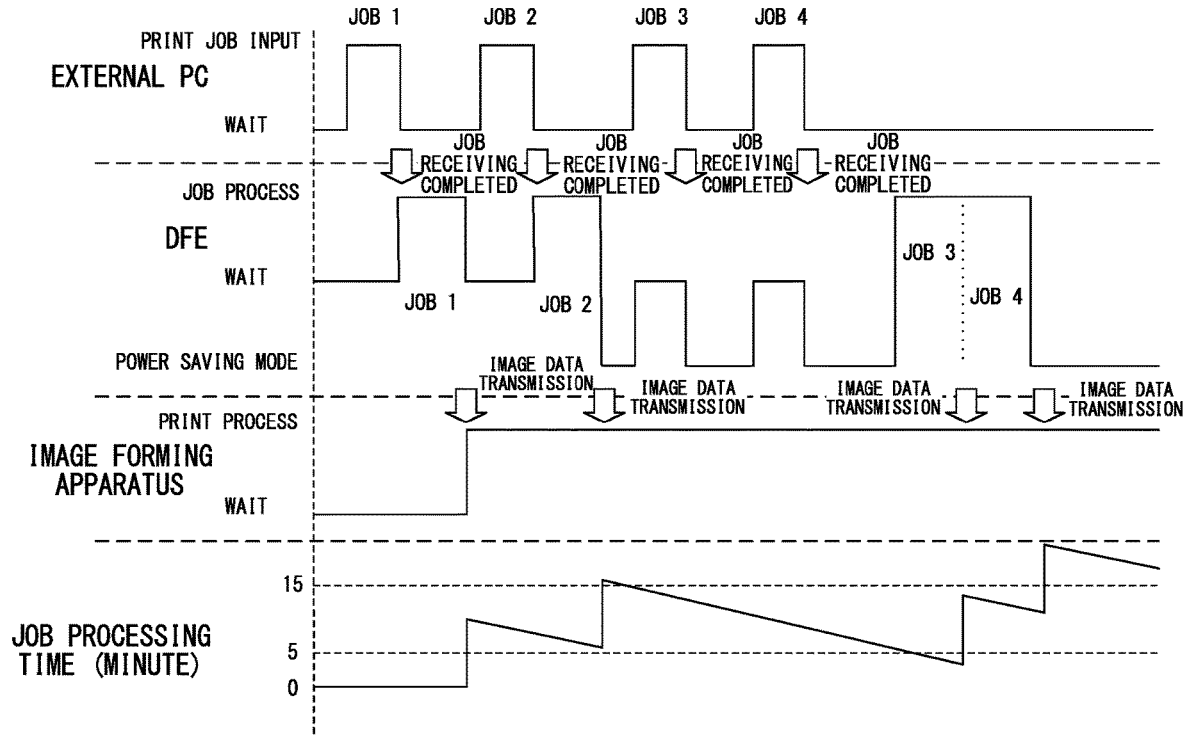

FIG. 3A and FIG. 3B are explanatory diagrams of power saving control of the DFE 201. FIG. 3A is a timing chart explaining a conventional operation. FIG. 3B is a timing chart explaining a power saving control of the present embodiment.

As described above, the DFE 201 converts a print job acquired from the external PC 203 into image data. The DFE 201 sends the converted image data to the image forming apparatus 10. The image forming apparatus 10 forms an image on the recording material S based on the image data acquired from the DFE 201.

The job control unit 210 calculates the job processing time required for printing the job when the job is registered in a print queue. For example, the job control unit 210 calculates that the job processing time for "Job 1" is 10 minutes. The job processing time decreases as the print process progresses. The job processing time is increased by continuously acquiring the image data of "Job 2", "Job 3", and "Job 4". This is because the image data generation time by the DFE 201 is faster than the printing time by the image forming apparatus 10. In the present embodiment, the DFE 201 transitions to the power saving mode in a case where the job processing time is more than a first predetermined time (15 minutes or more in the present embodiment). Further, the DFE 201 returns from the power saving mode in a case where the job processing time is less than the second predetermined time (less than 5 minutes in the present embodiment). The first predetermined time (15 minutes in the present embodiment), which triggers the transition to the power saving mode, is more than the second predetermined time (5 minutes in the present embodiment), which triggers the return from the power saving mode.

In the conventional process shown in FIG. 3A, a delay occurs between the image data generation process by the DFE 201 and the print process by the image forming apparatus 10. The job processing time continues to increase because the interval for acquiring image data is less than the interval for completing one job. As a result, the print queue stored in the memory 211 of the printer controller 200 reaches the maximum amount that can be stored in a job storage area. In this case, the DFE 201 has a waiting time during which it cannot send image data to the image forming apparatus 10. Since the DFE 201 operates even in the standby time, power is wasted.

In FIG. 3B, due to "Job 1" and "Job 2", the job processing time becomes more than or equal to the first predetermined time (15 minutes or more). The job processing time is in the print processing information, and is sent from the printer controller 200 to the DFE 201. The DFE 201 can detect the job processing time of the image forming apparatus 10 based on the print processing information. The DFE 201 uses the power control unit 205 to determine whether to transition into the power saving mode based on the print processing information. The job processing time becomes 15 minutes or more because "Job 2" is sent to the printer controller 200, therefore, the power control unit 205 of the DFE 201 determines whether to perform the transition from the normal power mode, in which the job process is performed, to the power saving mode, which consumes less power than the normal power mode. In the power saving mode, the DFE 201 suspends a print job conversion process by the image processing unit 204 and an image data transmission process to the image forming apparatus 10. In the power saving mode, the clock signal generator 208 may, for example, lower the frequency of the clock signal than the frequency of the clock signal in the normal power mode. Further, in the power saving mode, the power control unit 205 may cut off power to a display 209 which is connected to the DFE 201 to inform the user about the processing content of the DFE 201, for example. The DFE 201 can acquire print jobs from the external PC 203 and print processing information from the image forming apparatus 10 even in the power saving mode. In FIG. 3B, the DFE 201 acquires "Job 3" and "Job 4" during the power saving mode. In the power saving mode, the DFE 201 may set a frequency (polling frequency) for acquiring the print processing information from the image forming apparatus 10 to be less than a frequency for acquiring the print processing information from the image forming apparatus 10 in the normal power mode.

By transitioning to the power saving mode, which consumes less power than during normal operation, the power consumption of the DFE 201 can be reduced. During the power saving mode, the print process by the image forming apparatus 10 is in progress. The power control unit 205 returns to the normal power mode in a case where the job processing time becomes less than the second predetermined time (less than 5 minutes in the present embodiment) due to the progress of the print process.

In a case where the DFE 201 completes returning to the normal operation, the DFE 201 resumes the conversion process of "Job 3" and "Job 4" acquired from the external PC 203 and the transmission processing of the image data. In a case where the image data transmission of "Job 4" is completed, the DFE 201 transitions to the power saving mode again because the job processing time of the image forming apparatus 10 becomes 15 minutes or more.

Thus, even if the image forming apparatus 10 is in the process of printing, the DFE 201 suspends the process according to the job processing time to transition to the power saving mode. Therefore, the DFE 201 can reduce the power consumption that would have been wasted. The DFE 201 can return from the power saving mode upon occurrence of a user operation or to display error information or supply information obtained from the image forming apparatus 10 during the power saving mode. Therefore, the power consumption can be reduced without loss of user convenience.

In the present embodiment, the job processing time is used as the condition for transitioning to the power saving mode, however, the number of print queues registered in the image forming apparatus 10 may also be used as the condition for transition. In other words, the DFE 201 may transition to or return from the power saving mode based on the number of print queues included in the print processing information acquired from the image forming apparatus 10. Also in this case, the DFE 201 can reduce the power consumption in the same way as in the case of using the job processing time. For example, the DFE 201 transitions to the power saving mode in a case where the number of print queues is equal to or more than a first predetermined number, and returns to the normal operation mode in a case where the number of print queues is less than a second predetermined number which is less than the first predetermined number. In this way, the DFE 201 transitions to the power saving mode and returns from the power saving mode by comparing 1) the print processing information, which indicate the progress of printing of the image forming apparatus 10 and 2) the first and second predetermined times (first predetermined number and second predetermined number), which are thresholds for transitioning to and returning from the power saving mode.

<Transition to Power Saving Mode>

Figure 4:
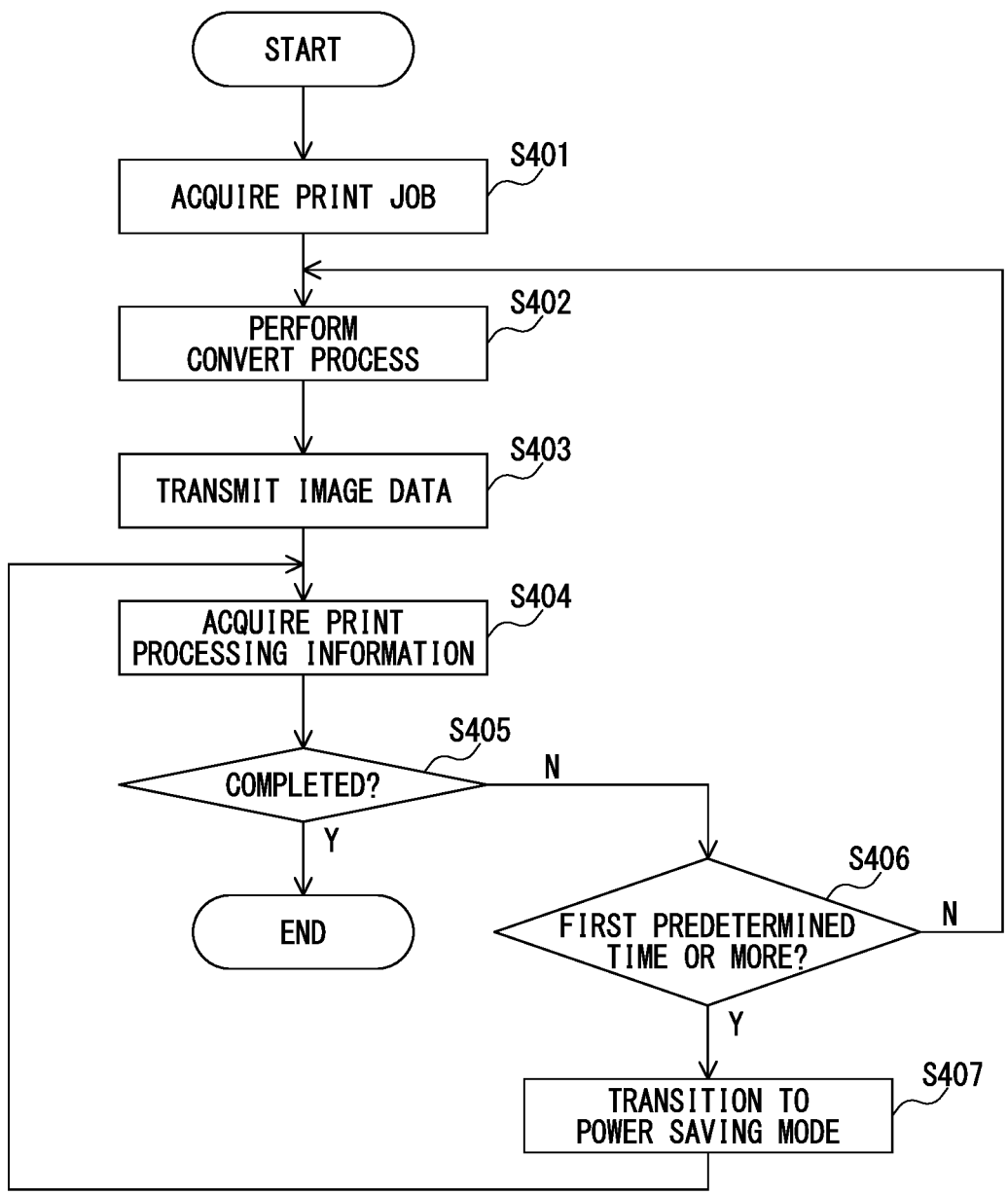
FIG. 4 is a flowchart representing a power saving mode transition process of the DFE.

FIG. 4 is a flow chart representing a power saving mode transition process of the DFE 201. In a case where the DFE 201 acquires a print job from the external PC 203 (Step S401), the DFE 201 converts the acquired print job into image data (Step S402). The DFE 201 transmits the image data generated by the conversion to the image forming apparatus 10 (Step S403).

The image forming apparatus 10 forms an image on the recording material S based on the image data acquired from the DFE 201. At that time, the printer controller 200 of the image forming apparatus 10 transmits the print processing information including the job processing time to the DFE 201. The DFE 201 acquires the print processing information including the job processing time from the image forming apparatus 10 (Step S404). The DFE 201 determines whether the print process by the image forming apparatus 10 has been completed (Step S405). In a case where the printing process is completed (Step S405: Y), the power saving shift process of the DFE 201 ends.

In a case where the print processing is not completed (Step S405: N), the DFE 201 determines whether the job processing time is more than or equal to the first predetermined time (15 minutes or more in the present embodiment) (Step S406). In a case where the job processing time is more than or equal to the first predetermined time (Step S406: Y), the DFE 201 transitions to the power saving mode to stop converting the print job into image data and to stop transmitting the image data to the image forming apparatus 10 (Step S407). After that, the DFE 201 repeats the processes from Step S404 until the job processing time becomes less than the second predetermined time. In a case where the job processing time is less than the first predetermined time (less than 15 minutes in the present embodiment) (Step S406: N), the DFE 201 converts the print job into image data and transmits the image data to the image forming apparatus 10. Then, the process of moving to Step S402 is performed again.

<Recovery From Power Saving Mode>

Figure 5:
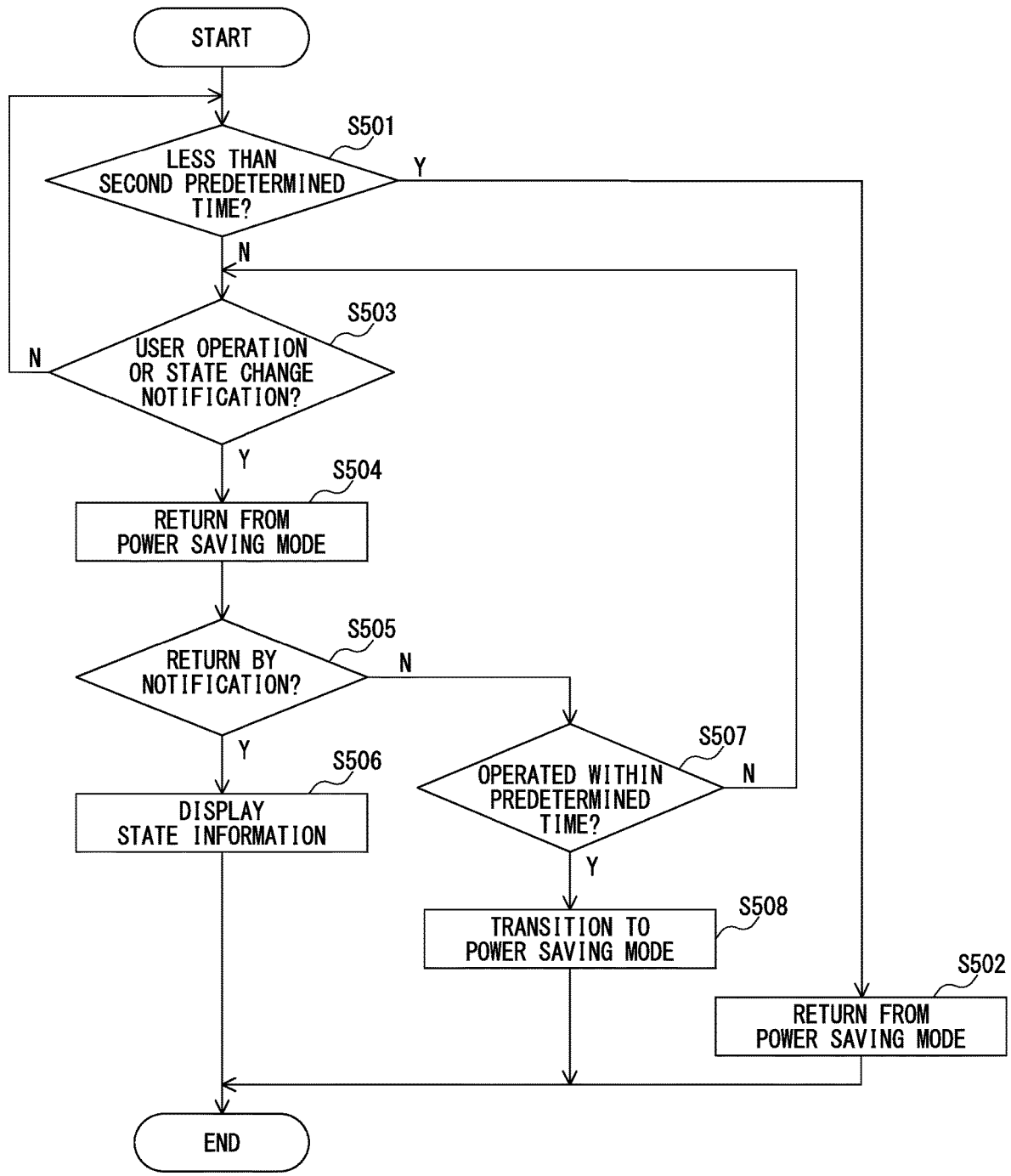
FIG. 5 is a flowchart representing a returning process from a power saving mode to a normal operation mode of the DFE.

FIG. 5 is a flow chart representing the process of returning from the power saving mode to the normal operation mode of the DFE 201. The DFE 201 determines whether the job processing time has become less than the second predetermined time (less than 5 minutes in the present embodiment) in the power saving mode (Step S501). In a case where the job processing time is less than the second predetermined time (Step S501: Y), the DFE 201 returns from the power saving mode (Step S502) to the normal operation mode to restart the conversion process of the print job into image data and the image data transmission process to the image forming apparatus 10.

In a case where the job processing time is equal to or more than the second predetermined time (5 minutes or more in the present embodiment) (Step S501: N), the DFE 201 checks whether the user operation or a state change notification from the image forming apparatus 10 has been obtained (Step S503). The state change notification is a notification which occurs in a case where the operating state of the image forming apparatus 10 has changed. For example, in a case where the state of the image forming apparatus 10 has changed from the power saving mode to the normal operation mode, or in a case where an error (apparatus malfunction) has occurred, or in a case where consumables such as toner and recording material S has been consumed, the printer controller 200 sends the state change notification that represents the content thereof to the DFE 201. The state change notification is performed by sending the print process information, for example. User operation includes an input from the operation unit 1000 to the printer controller 200. In a case where there is no user operation or no state change notification (Step S503: N), the DFE 201 maintains the power saving mode, and determines whether the job processing time becomes less than the second predetermined time (less than 5 minutes in the present embodiment) in Step S501.

In a case where there is the user operation or the state change notification (Step S503: Y), the DFE 201 performs a recovery operation from the power saving mode as in Step S502 (Step S504). At this time, the DFE 201 determines whether the trigger for returning from the power saving mode is a user operation or acquisition of the state change notification (Step S505). In a case where the trigger is acquisition of the state change notification (Step S505: Y), the DFE 201 instructs the external PC 203 to display the content of the state change notification of the image forming apparatus 10 (Step S506). The DFE 201 transmits the state change notification of the image forming apparatus 10 to the external PC 203 and displays the content of the state change notification on the display 209. Thereby, the DFE 201 notifies the user of the state change of the image forming apparatus 10.

In a case where the trigger is the user operation (Step S505: N), the DFE 201 measures an elapsed time since the last user operation. In a case where the elapsed time is within a predetermined time (Step S507: Y), the DFE 201 returns to the process of Step S503. In a case where the elapsed time is equal to or more than the predetermined time (Step S507: N), the DFE 201 transitions to the power saving mode (Step S508).

Based on progress information of the print process such as the job processing time and the number of print queues acquired from the image forming apparatus 10, the DFE 201 determines whether to transition to the power saving mode or to return from the power saving mode to the normal operation mode. Thus, the DFE 201 determines whether to transition to the power saving mode based on the progress information. Due to the above control, it is possible to reduce the power consumption of the information processing apparatus, such as the DFE 201, externally attached to the image forming apparatus 10. Further, the DFE 201 notifies the user of this notification in a case where a change in the printing state is notified by the printer controller 200, even in the power saving mode. Therefore, loss of user convenience does not occur even in the power saving mode.

In a case where the progress information is the job processing time, the DFE 201 transitions to the power saving mode to suspend the image data generation and image data transmission if the job processing time is equal to or more than the first predetermined time. In a case where the job processing time becomes less than the second predetermined time, the DFE 201 returns from the power saving mode to the normal operation mode to resume the image data generation and the image data transmission. The second predetermined time is less than the first predetermined time.

In a case where the progress information is the number of print queues, the DFE 201 transitions to the power saving mode and suspends the image data generation and the image data transmission if the number of print queues is equal to or more than the first predetermined number. In a case where the number of print queues becomes less than the second predetermined number, the DFE 201 returns from the power saving mode to the normal operation mode to resume the image data generation and the image data transmission. The second predetermined number is less than the first predetermined number.

In this embodiment, the DFE 201 acquires the job processing time and the number of print queues from the image forming apparatus 10, however, it is not restricted to this. For example, the DFE 201 may calculate the job processing time and the number of print queues based on the image data to be sent to the image forming apparatus 10 to determine whether to transition from the normal power mode to the power saving mode according to the method described above.

Further, in the present embodiment, the DFE 201 determines whether to transition from the normal power mode to the power saving mode based on the number of print queues and the job processing time sent from the image forming apparatus 10, however, it is not restricted to this. For example, the control unit 212 may determine whether to control the DFE 201 to transition from the normal power mode to the power saving mode based on the job processing time and the number of print queues by the method described above. In this case, the control unit 212 may out put the result of its determination to the DFE 201. The DFE 201 may change its power mode from the normal power mode to the power saving mode based on the result of the determination.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-039449, filed Mar. 14, 2022, which is hereby incorporated by reference herein in its entirety.

What is claimed is:

1. An image forming system comprising:
an information processing apparatus, which serves as a digital front end of an image forming apparatus, configured to generate print data based on a print job to form an image on a recording medium and output the print data to the image forming apparatus, the information processing apparatus being configured to be operable in a plurality of power modes including a normal power mode in which the print data is able to output and a power saving mode in which power consumption is less than the normal power mode and in which the print data is not able to output;
the image forming apparatus comprising:
a storage unit configured to store the information about two or more print data output from the information processing apparatus; and
an image forming unit configured to form an image on the recording medium based on the print data stored in the storage unit,
wherein, in a state where the power mode of the information processing apparatus is the normal power mode, in a case where a processing time required for completing an image forming based on the print data which has been received by the image forming apparatus from the information processing apparatus and has not been printed becomes more than a first predetermined value, outputting of the print data which has been received by the information processing apparatus and has not been transmitted to the image forming apparatus, from the information processing apparatus to the image forming apparatus, is stopped, and the power mode is transitioned from the normal power mode to the power saving mode,
wherein, in a state where the power mode of the information processing apparatus is the power saving mode, in a case where the processing time becomes less than a second predetermined value, the power mode is transitioned from the power saving mode to the normal power mode, and the outputting of the print data which has been received by the information processing apparatus and has not been transmitted to the image forming apparatus, from the information processing apparatus to the image forming apparatus, is started, and
wherein the second predetermined value is less than the first predetermined value.

2. The image forming system according to claim 1, wherein the image forming apparatus outputs the processing time to the information processing apparatus, and wherein the information processing apparatus switches between the power saving mode and the normal power mode based on the processing time output from the image forming apparatus.

3. The image forming system according to claim 2, wherein the information processing apparatus outputs a request signal requesting the progress information in the power saving mode at a first period to the image forming apparatus, and outputs the request signal in the normal power mode at a second period which is less than the first period to the image forming apparatus, and
wherein the image forming apparatus outputs the processing time based on the request signal.

4. The image forming system according to claim 1, wherein the information processing apparatus determines the processing time based on the print data output to the image forming apparatus, and
wherein the information processing apparatus switches between the power saving mode and the normal power mode based on the processing time.

5. The image forming system according to claim 1, wherein the information processing apparatus operates in the power saving mode based on a clock signal of a first frequency, and operates in the normal power mode based on a clock signal of a second frequency which is more than the first frequency.

6. The image forming system according to claim 1, wherein a display configured to display a screen is connected to the information processing apparatus, and power to the display is cut off in the power saving mode.

7. An information processing apparatus, which serves as a digital front end of an image forming apparatus, configured to communicate with an image forming apparatus configured to form an image on a recording medium, the information processing apparatus being configured to be operable in a plurality of power modes including a normal power mode in which print data is able to output and a power saving mode in which power consumption is less than the normal power mode and in which the print data is not able to output, the information processing apparatus comprising:
a receiver configured to receive a print job for forming an image on a recording medium;
a generator configured to generate print data based on the print job received from the receiver;
a communication device configured to output the print data to the image forming apparatus; and
a controller configured to control a power mode of the information processing apparatus,
wherein, in a state where the power mode of the information processing apparatus is the normal power mode, in a case where a processing time required for completing of the image forming based on the print data which has been received by the image forming apparatus from the information processing apparatus and has not been printed becomes more than a first predetermined value, the communication device is configured to stop outputting of the print data which has been received by the receiver and has not been transmitted to the image forming apparatus to the image forming apparatus, and the controller is configured to switch the power mode from the normal power mode to the power saving mode,
wherein, in a state where the power mode of the information processing apparatus is the power saving mode, in a case where the processing time becomes less than a second predetermined value, the controller is configured to switch the power mode from the power saving mode to the normal power mode, and the communication device is configured to start the outputting of the print data which has been received by the receiver and has not been transmitted to the image forming apparatus to the image forming apparatus, and wherein the second predetermined value is less than the first predetermined value.

8. The information processing apparatus according to claim 7, wherein the information processing apparatus determines the processing time based on the number of the print data output to the image forming apparatus, and wherein the information processing apparatus switches between the power saving mode and the normal power mode based on the processing time.

9. The information processing apparatus according to claim 7, wherein the information processing apparatus operates in the power saving mode based on a clock signal of a first frequency, and operates in the normal power mode based on a clock signal of a second frequency which is more than the first frequency.

10. The information processing apparatus according to claim 7, wherein a display configured to display a screen is connected to the information processing apparatus, and power to the display is cut off in the power saving mode.

\* \* \* \* \*